July 25, 1933. G. R. FOX 1,919,694
MACHINE FOR THE MANUFACTURE OF LAMINATED FIBROUS PULLEYS
Filed Aug. 29, 1930 2 Sheets-Sheet 2
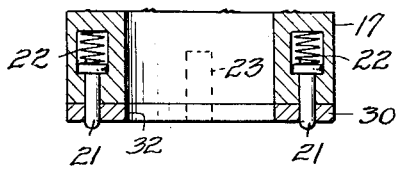
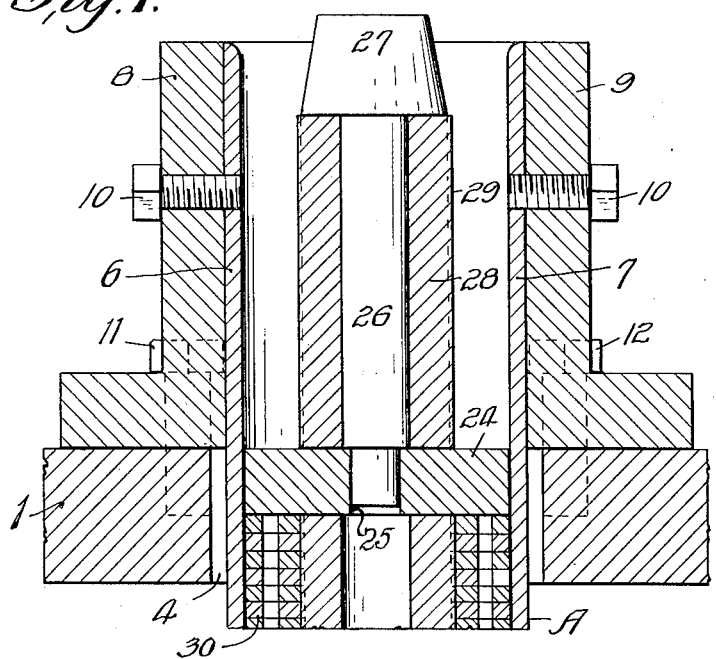
INVENTOR:
George R. Fox.
BY
ATTORNEY.

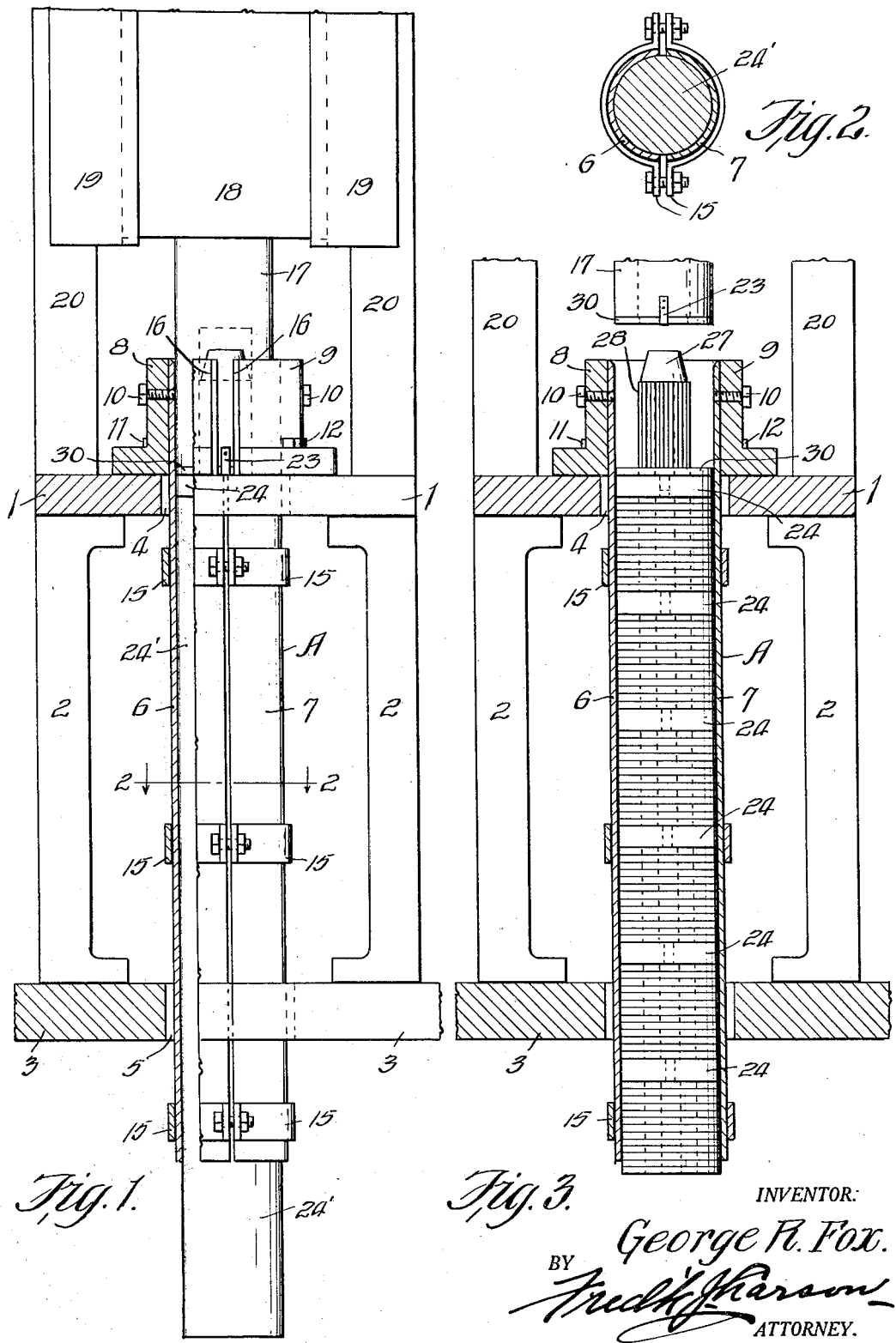

Patented July 25, 1933

1,919,694

UNITED STATES PATENT OFFICE

GEORGE R. FOX, OF ST. LOUIS, MISSOURI

MACHINE FOR THE MANUFACTURE OF LAMINATED FIBROUS PULLEYS

Application filed August 29, 1930. Serial No. 478,770.

My invention relates to an apparatus, or machine for the manufacture of laminated fibrous pulleys under mass production, one above the other; and, the objects of my invention are, first, to provide a vertically supported tubular member within the upper end of which pulleys are formed and finally discharged from the lower end of the tubular member; second, to provide the tubular member, which is preferably of two pieces, with means for varying the inside diameter of the tubular member; third, to initially provide the tubular member with a cylindrical dummy member to gauge the inside diameter of the tubular member and to support an initial pulley separating plate; fourth, to provide a guide pin adapted to be detachably supported by the separating plates for holding the core of each pulley to be formed centrally of the tubular member; fifth, to provide a vertical plunger for depositing fibrous disks within the tubular member and facing them one against the other under pressure around the pulley core; sixth, to provide the plunger with means for properly positioning the fibrous disks upon the lower face of the plunger; and, seventh, to provide the plunger with resilient means for gripping the peripheral face of each disk during the down stroke of the plunger and releasing the disk at the commencement of the upstroke of the plunger.

A still further object of the invention is the provision of a machine for the manufacture of laminated fibrous pulleys having a tubular metallic core, which possesses advantages in points of simplicity and efficiency, and, at the same time proves itself comparatively inexpensive in cost of manufacture.

With the above and other objects in view, the invention consists in the novel features of construction, arrangement and combination of parts hereinafter more fully described and finally pointed out in the claims hereto appended.

Referring to the accompanying drawings forming a part of this specification, wherein like characters of reference denote similar parts throughout the several views:

Fig. 1 is a front elevation and partly in sectional elevation of a machine embodying the features of my invention.

Fig. 2 is a transverse sectional view taken on line 2—2 of Fig. 1.

Fig. 3 is a vertical sectional view of the machine.

Fig. 4 is a vertical sectional view of the upper part of the tubular portion of the machine.

Fig. 5 is a top plan view thereof.

Fig. 6 is a side elevation of a formed pulley.

Fig. 7 is an end elevation of the pulley.

In carrying out the aim of my invention, I employ a table of plate 1 and together with its legs 2 constitute the framework of my machine, which is supported upon a floor 3.

A tubular member designated generally as A, passes downwardly through an opening 4 in the plate 1. The length of the tubular member A may be of such length as to pass through an opening 5 in the floor 3, or it may be extended so as to pass through several floors of a building, or on the other hand, it may terminate at its lower end short of the floor 3, so that formed pulleys discharged from the lower end thereof may drop on the floor 3, or upon a conveyor for transmitting them to some remote point.

The tubular member A is preferably made of two metallic sections designated 6 and 7 which are secured near their upper ends to a pair of suitable angle plates 8 and 9 respectively, by means of suitable fastening devices, such for instance as screws 10. The tubular member A depends from the angle plates 8 and 9, which plates are adjustably supported upon the top surface of the table or plate 1 by means of bolts 11 and 12, respectively, which bolts pass through slotted openings 13 and 14, respectively, of the angle plates 8 and 9 and which bolts have screw threaded connection with the table or plate 1, as will be apparent in Figs. 3 and 4. This arrangement permits the inside diameter of the tubular member A to be slightly varied, as desired.

The tubular member A is provided at intervals along its length with suitable separable or split clamping members 15, which limit expansion of the tubular member.

The corners of the upper end portion of each section of the tubular member A is cut-away, as at 16, to provide a sight opening into the tubular member above the table or plate 1, as will be clearly apparent from Figs. 1 and 4.

A suitable hollow plunger 17 is disposed above the upper end of the tubular member A and in axial alignment therewith. The plunger is suitably carried by means of a member 18 slidably carried by means of suitable guide members 19 carried by means of suitable supports 20 having connection at their lower ends with the table and plate 1.

The lower end of the plunger 17 is provided with a plurality of vertically movable guide pins 21 which protrude beyond the lower face of the plunger 17 and which are backed by means of suitable coiled springs 22 for normally holding the pins in their protruded positions. The lower end of the plunger 17 is further provided with a pair of opposed spring, or resilient members 23 which are suitably secured to the outer face of the plunger and the free ends of which extend a suitable distance below the lower face of the plunger and which are adapted to be received in the sight openings of the tubular member A when the plunger descends, as will be apparent in Fig. 1.

Associated with the tubular member A are a plurality of pulley separating plates 24 each of which is provided with a central opening 25. The plates 24 act in the dual capacity of a support adapted to support a suitable detachable arbor 26 in a vertical position thereupon. The arbor 26 extends upwardly from the plate 24 upon which a pulley is to be formed and the upper end of the arbor is provided with a truncated cone shaped head 27 larger in diameter than the arbor stem 26. The arbor 26 is adapted to receive a tubular metallic pulley core 28 and hold it in a position within the tubular member A in axial alignment therewith and the plunger, as clearly shown in Fig. 3. The core 28 has its outer face provided with a multiplicity of longitudinal serrations 29 which extend beyond the lower edge of the truncated cone shaped head of the arbor 26, when the several parts are assembled, as will be apparent from Figs. 3 and 4.

*Operation*

In the manufacture of pulleys constructed of plates, or disks of fibrous material, such for instance as leather, leather composition, strawboard, or the like, the assembly of pulleys are carried out one above the other within the tubular member as follows:

In order to form the first pulley, the dummy cylindrical member 24' is inserted into the tubular member A with the upper face thereof preferably a little below the upper face of the table or plate 1 and a little below the lower edge of the opposed sight openings of the tubular member A. The tubular member is then adjusted, if necessary, to properly fit the dummy member 24' so that it will be slidable, but frictionally held in its position.

A separating plate 24 is then mounted upon the upper face of the dummy member 24' and has its upper face disposed in a plane with the upper face of the table or plate 1.

A tubular metallic core 28 is then mounted upon the arbor 26 and the arbor then is seated upon the plate 24, as will be apparent from Fig. 3.

The operator then applies a fibrous plate, or disk 30 upon the lower face of the plunger 17, the upper face of which disk is provided with a suitable adhesive. The plate or disk 30 is provided with a plurality of guide openings 31 which are adapted to receive the yieldable guide pins of the plunger and the spring arms 23 of the plunger are adapted to frictionally grip the side edge of the disk for holding it to the lower face of the plunger.

The disk 30 is also provided with a central opening 32 which is of slightly less diameter than the outside diameter of the longitudinally serrated outer face of the core so that when the plunger is released to move in its downward stroke, the disk carried thereby will be forced over the core causing the serrations thereof to bite into the edge of the central opening thereof, which causes the disk to be securely mounted thereon free from possible rotation of the disk upon the core after the pulley has been formed. After the plunger has completed its downstroke carrying the pulley disk therewith, the plunger ascends leaving the pulley disk within the tubular member and in frictional contact with both the wall of the tubular member and the core of the pulley being formed. This operation of applying pulley disks adhesively coated upon one face only to the plunger and then depositing them under plunger pressure one upon the other within the tubular member and surrounding the core is repeated until the pulley has been fully formed. The pulley being formed descends the thickness of each disk with each downstroke of the plunger.

After the first pulley has been formed, the arbor is removed from the plate below the formed pulley, a new separating plate is mounted upon the formed pulley, the arbor is again positioned with a new core member applied thereto and the plunger operations carry disks into the tubular member and onto the core and are again repeated until the second pulley is formed.

A third pulley is formed upon the second pulley, and so on, until the formed pulleys are automatically discharged from the lower open end of the tubular member A and from where they are removed to be finished into final shape and form.

By means of the foregoing machine, it is evident that laminated pulleys may be made progressively, one above the other, without handling the formed pulleys until after they have been discharged from the lower open end of the tubular member A, which results in increased production over the handling of each pulley immediately after it has been formed.

The many advantages of the herein described invention will readily suggest themselves to those skilled in the art to which it appertains.

From the foregoing description, it is evident that a simple device for this purpose has been disclosed, but it is to be understood that I do not desire to restrict, or limit myself to the very details of the construction shown and described, which is merely illustrative, it being obvious that changes, not involving the exercise of invention, may be made without conflicting or departing from the spirit of the invention within the scope of the appended claims.

What I claim is:

1. An apparatus for making pulleys having a laminated fibrous body, comprising a vertically disposed tubular member open at both ends and within which the pulleys are adapted to be formed and discharged from the lower open end thereof and a plunger movable in and out of the upper end of the tubular member for assembling the pulley laminæ and discharging the formed pulleys from the lower open end of the tube.

2. An apparatus for making pulleys having a laminated fibrous body, comprising a separable and adjustable tubular member open at both ends, means for supporting the tube in a vertical position, a plunger movable in and out of the upper end of the tubular member and resilient means carried by the peripheral face of the plunger for holding laminæ applied to the lower face of the plunger against displacement thereon.

3. An apparatus for making pulleys having a laminated fibrous body, comprising a tubular member supported in a vertical position, a plunger movable in and out of the upper end of the tubular member, means carried by the plunger for guiding laminæ applied thereto against sidewise displacement thereon and resilient means carried by the plunger for holding laminæ positioned upon the plunger against removal therefrom prior to and during the downstroke of the plunger.

4. An apparatus for making pulleys having tubular metallic cores and a laminated fibrous body comprising a two-piece tubular member, means for supporting said member in a vertical position, means for varying the inside diameter of the tubular member, an initial plate adapted to be positioned in the tubular member, means for gauging the position of said plate, a vertical post carried by the plate for supporting the core of the pulley within the tubular member and vertically movable means for depositing one fibrous disk at a time within the tubular member around the supported core, said pulleys adapted to be formed one above the other with a plate separation between each pulley and said pulleys adapted to be discharged from the lower end of the tubular member.

5. A machine for the manufacturing of pulleys having a tubular metallic core and a laminated fibrous surrounding belt riding body comprising a vertical tubular member, means for supporting said tubular member, means for varying the inside diameter of said tubular body, a dummy cylinder member for initial inserting in said tubular body to gauge the desired inside diameter of the tubular body and to act as an initial support for a plate adapted to support a post for guiding the core of the pulley body to be formed and a plunger adapted to carry fibrous pulley body laminæ into the tubular member for forcing it over the core and applying one lamina upon another under pressure until the pulley has been formed, said pulleys being formed one above the other with a separating plate interposed therebetween and the formed pulleys and their separating plates adapted to be discharged from the lower end of the tubular member.

6. The combination, in a machine of the class described, of a tubular member the inside diameter of which can be varied, and within which pulleys are adapted to be formed one above the other and a plunger disposed above the tubular member adapted to feed disks adhesively coated upon one side into the tubular member and to and around a metallic core supported by a plate disposed within the tubular member.

7. In a machine for the manufacture one above the other of laminated fibrous pulleys having a tubular metallic core, a separable tubular member, a support from which said tubular member depends, means within the tubular member for separating the pulleys being formed from one another and for supporting the core of the pulley being formed and a plunger disposed above the tubular member and in axial alignment therewith to which are applied aperatured fibrous plates adhesively coated on one face and which are adapted to be carried downwardly by the plunger and deposited within the tubular member and around the core of the pulley being formed, said formed pulley not being removed from the tubular member when completed but allowed to remain therein and being forced downwardly within the tubular member as the pulleys are formed until such number of pulleys have been formed that they will be automatically discharged from the lower end of the tubular member.

GEORGE R. FOX.